US008990111B2

(12) United States Patent
Vieri

(10) Patent No.: US 8,990,111 B2
(45) Date of Patent: Mar. 24, 2015

(54) AUCTIONING SYSTEM AND METHODS INTERACTING WITH MULTIPLE DEVICES

(76) Inventor: Riccardo Vieri, Montespertoli-Florence (IT)

( * ) Notice: Subject to any disclaimer, the term of this patent is extended or adjusted under 35 U.S.C. 154(b) by 577 days.

(21) Appl. No.: 13/234,235

(22) Filed: Sep. 16, 2011

(65) Prior Publication Data

US 2012/0095860 A1    Apr. 19, 2012

(30) Foreign Application Priority Data

Oct. 18, 2010    (IT) ................. FI2010A0213

(51) Int. Cl.
*G06Q 30/00* (2012.01)
*G06Q 30/08* (2012.01)
*G06Q 30/02* (2012.01)
*G06Q 30/06* (2012.01)

(52) U.S. Cl.
CPC ............ *G06Q 30/08* (2013.01); *G06Q 30/0235* (2013.01); *G06Q 30/0643* (2013.01); *G06Q 30/0275* (2013.01)
USPC .......................... 705/26.3; 705/26.1; 705/27.1

(58) Field of Classification Search
CPC .............. G06Q 30/08; G06Q 30/0641; G06Q 30/0235; G06Q 30/0275; G06Q 30/0643
USPC .................................. 705/26.1, 27.1, 26.3
See application file for complete search history.

(56) References Cited

U.S. PATENT DOCUMENTS

| | | | |
|---|---|---|---|
| 2002/0082980 A1* | 6/2002 | Dinwoodie | 705/37 |
| 2002/0174060 A1* | 11/2002 | Friedland et al. | 705/37 |
| 2005/0246266 A1* | 11/2005 | Stefanovic et al. | 705/37 |
| 2007/0185774 A1* | 8/2007 | Schreiber et al. | 705/26 |
| 2008/0281720 A1* | 11/2008 | Hassan | 705/26 |
| 2009/0119187 A1* | 5/2009 | Goino | 705/26 |

OTHER PUBLICATIONS

"Innovations in Retail Pricing and Promotions" (Journal of Retailing; Grewal, Dhruv; Ailawadi Kusum; Gauri, Dinesh; Hall, Kevin; Kopalle, Praveen; Robertson, Jane. Apr. 22, 2011).*

* cited by examiner

*Primary Examiner* — Courtney Stopp
(74) *Attorney, Agent, or Firm* — Valauskas Corder LLC

(57) ABSTRACT

An auctioning system and methods interacting with multiple devices are set forth that includes a main server, remote terminals, and remote individual communication devices that communicate with one another and are adapted to display information to a user about a product or service for sale, and information pertaining to predefined auction parameters for the user to attempt to purchase said product or service.

30 Claims, 9 Drawing Sheets

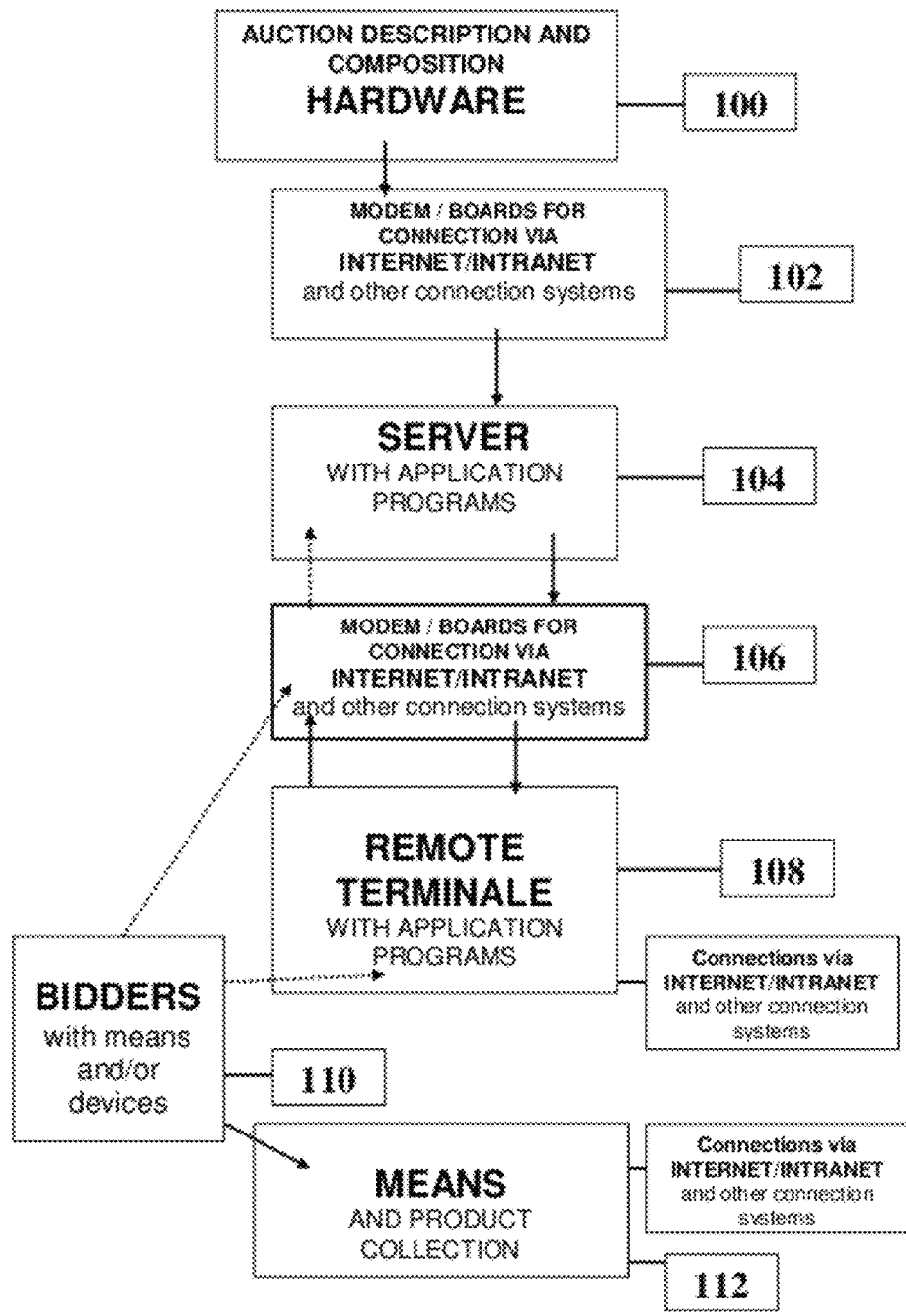

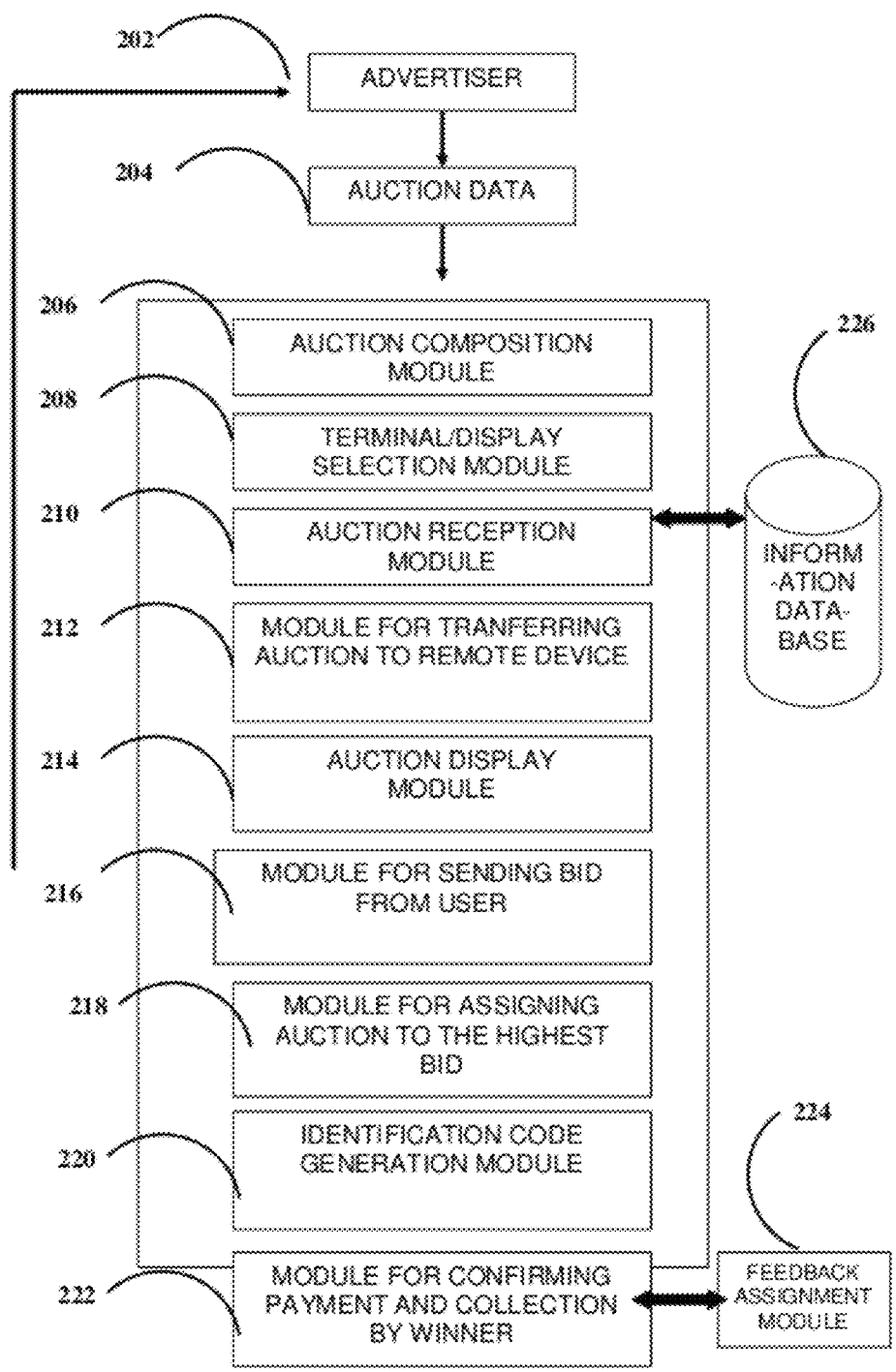

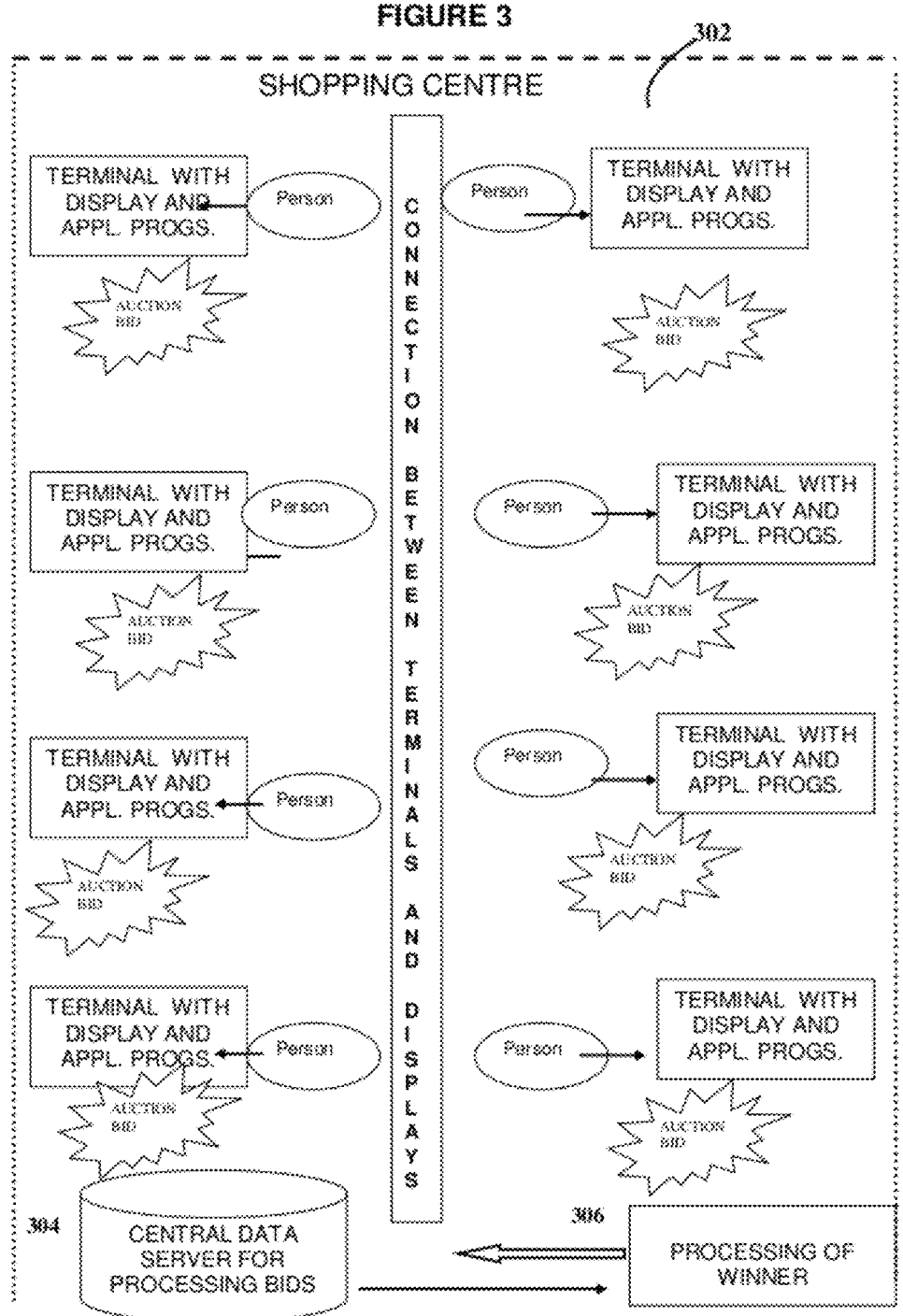

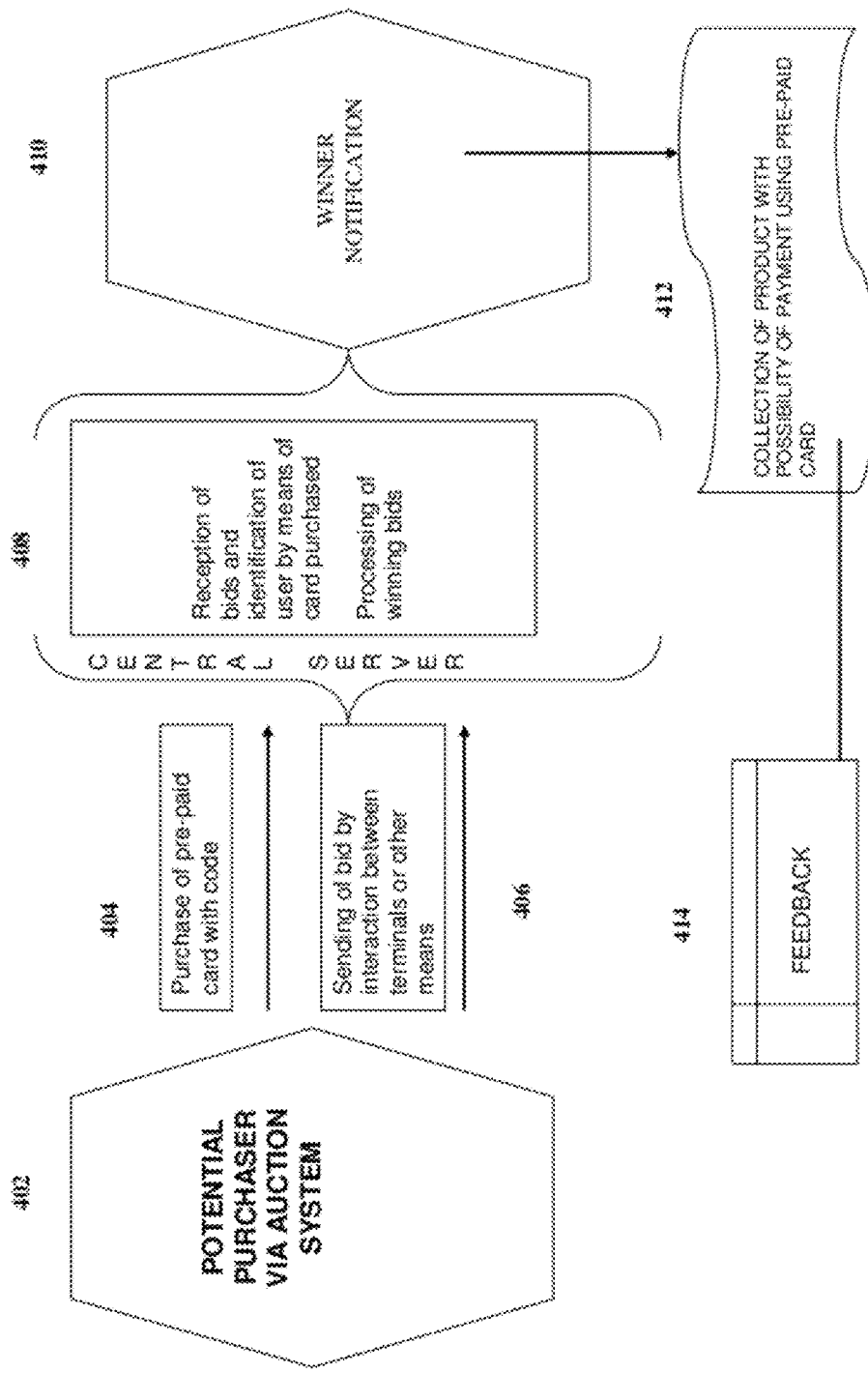

FIGURE 5

Create an auction campaign

Campaign name
Campaign start date
Campaign duration
Minimum reserve price

TARGET DISPLAYS

| | |
|---|---|
| Nation | |
| Location | |
| Type | |
| Target | |
| Start date | |
| Duration of auction | a8 |

Check potential number of TERMINALS which can be reached by campaign in Italy

Check

CREATE OFFER

| PERSONALIZATION OPTIONS | Compose text to be displayed |
|---|---|
| Load photo | |
| Load video | |
| Load audio | |

PUBBLICIZE

AUCTIONING SYSTEM AND METHODS INTERACTING WITH MULTIPLE DEVICES

PRIORITY

Priority is claimed to Italian Application No. FI2010A000213 filed on Oct. 18, 2010.

DESCRIPTION

1. Field of Invention

This invention relates to auctioning systems and methods accomplished through interacting with multiple devices including a main server, remote terminals, and remote individual communication devices that communicate with one another and are adapted to display information to a user about a product or service for sale, and information pertaining to predefined auction parameters for the user to attempt to purchase said product or service.

2. Background of the Invention

Local advertising is constantly increasing, while mobile terminals, computers, and PDAs are increasingly being used as promotion means. The shops are full of products on sale and waiting to be sold, which stock must be disposed of as soon as possible. Owing to the development of digital/terrestrial decoders, satellite TV, Premium-on-Demand channels, etc., interaction between user and advertiser is increasingly more frequent with the possibility for new forms of advertising.

The problem with sales performed by means of telematic auctions is that although they offer many advantages, they also have several weak points. Purchasers are afraid that they will never receive the merchandise ordered or that they will receive a mismatch.

Furthermore, certain products which are of an alimentary nature or intended for consumption cannot be purchased remotely owing to the risk of deterioration and because they cannot be sampled (for example, it is not possible to taste a food product before buying it). eBay, which is the most popular on-line auctioning website, has partly overcome the problem of reliability of suppliers, by means of a scoring system based on feedback and by using payment methods, for example PayPal, which can provide the purchaser with some form of compensation in the event of fraud and/or products which do not correspond to the descriptions provided. Even so, in the case of particularly expensive products, the public does not like making payments by means of PayPal or credit card, and most transactions are still performed by means of bank transfer. Moreover, since the transactions are between individuals, the principle of "bought as seen" reigns. Basically, there are many problems to be dealt with.

Digital Signage, which is a form of digital advertising on displays in public premises, is becoming increasingly more widespread, but the sale of products or services advertised on them is struggling to take off.

Other companies are vying to offer decoders and/or modified TV sets provided with the PiP (picture in picture) function, so that they are able to show their own advertising during viewing of programs by families.

There is a need for a system which can transfer intelligent auctioning onto concrete physical workstations, so that it is not just limited to internauts.

There is a need for a system which allows the diffusion also of consumable goods and food products by means of auctioning, such that the purchaser can collect the goods or products in situ.

There is a need for a system which protects the privacy of the buyers, without their data being able to be acquired by third parties and/or being transmitted on communication channels and without, in any case, the risk of said data being intercepted.

There is a need for a system which can reach potential consumers while they are out shopping and advertise specific advantageous offers.

The present invention relates to a data transmission system which, by means of a precise method, allows the displaying of products on devices equipped with a display, with the possibility for an immediate interaction with the individual concerned, who in real time may make a bid and be informed as to the prices of the other bids and then find out whether he/she has been awarded the product and/or service. Once the auction has terminated, the winner may collect the product and/or the service directly from the retail outlet, ensuring the maximum privacy and the non-traceability of any remotely transmitted data. Furthermore, where possible, the system envisages the possibility of assigning points to the purchaser so that, in the event of failure to collect and pay for the merchandise, the purchaser may be penalized. The same scoring system may be applied to the suppliers depending on the quality of the goods/services provided.

As a result of the present system, traders will be able to sell off surplus products, discounted products, etc., by means of remote interactive auctions to all those families who have new interactive advertising systems connected to a TV at home. The users who make a purchase remain anonymous to the supplier and collect the products from a special local distribution centre or directly from the vendor.

Furthermore, the same system results in an improved efficiency of the system for promoting products and/or services via digital signage, namely by means of remote terminals arranged inside public premises and/or externally in locations wherein there are a lot of people, for example in shopping centres, where terminals are provided and where the individuals can bid for the product/service and immediately collect it should they win the auction.

The operating principle is simple. The user who sees an offer, by interacting with the display in various ways, makes a bid and is informed in real time of the other bids. The winner of the auction, which may last only a few seconds, receives a code and undertakes to purchase the product with the associated code. Then, the user goes to the collection point, pays for and collects the goods/service. The users for each reservation and order which is subsequently collected may leave a feedback regarding the supplier and the quality of the goods. In the same way, if the user is registered, he/she may receive a negative feedback if the goods are not collected and paid for.

In a different situation, an individual has a card which may also be purchased and which contains a code for taking part in a certain number of auctions. For example, the card may be valid for a certain number of bids. When the auction ends, the individual in question must supply his/her code which corresponds to that shown on the card. Once this has been done, the product/service is collected from the place indicated. The card may also be of the pre-paid type, i.e. it may contain a certain amount of money which can be topped up and which can be used by the user to pay for the product which has been won.

According to another situation, the winner of the auction must communicate a password, a pin or some other identification data in order to be able to withdraw the goods and/or service won. The winner can send said data to the central server and/or interact with the display.

According to another characteristic feature, the winner may be identified by means of scanning of his/her fingerprints. Upon winning the auction, the individual concerned will record his/her data by means of a fingerprint reader and then, again by means of fingerprint scanning, he/she will collect the product, being automatically identified.

The auction may involve both a single product/service and a stock of products and/or services. It is also possible for the product on offer to be kept secret, namely without a full description or photograph, but only with an indication of the functions it performs or its features. This may be useful, for example, in the case of brands which are less well known, so that they may be nevertheless distributed, or in the case of unsold products, so that they may be purchased based on their features. The same product/service on offer, in the event of there being prizes, may be acquired using points and not money.

With the present system, it is possible to acquire goods by means of an auction system without use of personal data as instead occurs for other on-line auction systems such as eBay, where it is instead required to register.

Inside a supermarket or a shopping centre, the system allows users to make bids also using a device provided or directly via the shopping cart. Let us take the example of a large supermarket with mega screens fixed to the ceilings or to the walls. Any individual interested in the offer is able to make a bid via a device provided by the supermarket. In this case, it will be the device itself which can identify where the bid has come from and the winner.

The displays showing the auction for the products and/or services sold using the interactive auction mode may be activated only if there is a certain number of people in the premises and close to the displays. This allows the auction to be activated only where certain conditions exist.

Obviously, the concept of a set of displays and/or separately defined zones is not limited to a shopping centre or a single environment, but may include, for example, a series of premises which are present in a given area, such as a group of bars, a group of gyms, etc. The same idea is applicable.

The system also envisages that the auction mechanism is not limited exclusively to an auction with a set completion time where the best bid made wins, but may also include a mechanism where the auction ends only when there is no other higher bid. For example, let us take the example of a product which is placed on sale at a starting price of 1 Euro. With the method just described, if there were only a single bid of 1.10 Euro, the sole bidder would win the product. On the other hand, if the time allowed for making a bid lapses every 60 seconds and another bidder offers 1.20 Euro and, at the end of the 60 seconds, there are no other bids, the bid of 1.20 Euro would win. Basically, this is a system where there are no set finish times, but a completion time which is reset to 0 at the end of each given time period if there are constant bids.

The method associated with the system also envisages that the objects which are placed on sale using the auction method may be publicised and printed out automatically and promoted within the premises. This allows wider advertising and also offers the opportunity for attracting people into specific premises with the aim of winning products and/or services which are of primary interest to them. Each single product and/or service on offer may be printed out, or a summary of a given number of products and/or services publicized may be printed.

Advantageously, the patent allows a product or service to be won by individuals using numerous means and applications as well as collection of the product won by the winner directly from the retail outlet. All of the above can be managed remotely by an advertiser who can enter the products to be sold with given properties and features.

By way of further explanation of some of the technical details, purely by way of example, a data processing system which may be used envisages the presence of a central server which is connected to the Internet 24 hours a day (Main Server, MS) for providing advertisements using the interactive auction selling method and which contains not only the software for managing this function, but also all the application management programs intended for the various users of the platform.

In addition, the system comprises one or more terminals for displaying the bids (abbreviated "VTPs" below) which are installed in trading premises and/or at family homes. The VTPs are equipped with a connection peripheral suitable for an Internet, intranet, telephone or other type of connection system. An operating system is installed on the VTPs for real-time display of the bids and interaction between the users concerned. The same VPT can accept directly the bids and/or send them to the central server. The VPT also allows the outcome of the auction and the winner to be displayed.

The interaction between the potential purchasers and the product/service being offered may also be performed through the available displays showing the auction. The individuals may interact with the display either by means of a touch screen where provided, or by means of Bluetooth, mobile phone SMS, and/or other digital connections, including satellite connections. The system envisages the presence of an ASR (Automatic Speech Recognition) system which can accept vocal bids. The device connected to the display records the bid and sends it to the central server as in the case of all the other bids. As a result, there is no need for material interaction with the apparatus, thereby reducing the risk of malfunctions affecting the terminals.

Upon completion, the auction may involve a count-down and, once the winning bid has been determined, will highlight the win on the terminal which is used for display, for making the bid and for receiving notification of the consequent win. For example, the terminal may emit a sound or an audible message or may light up and draw the user's attention to the win.

Whoever publicizes the auction, may repeat it as desired by simply repeating the publication procedure until there is a winner.

It is also possible for consumers to use a special shopping cart equipped with a device which can communicate with the central server. This device may be more or less sophisticated. It may also consist of a simple device which can send pulsed signals to the central server, where each pulsed signal is associated with a bid. For example, whenever a button is pressed, a bid of 20 cents is made. The same device can receive the winning signal and at least draw the winner's attention to the win, at least by means of a sound signal. More complete devices may also comprise displays and be connected via WiFi to the central server and allow immediate interaction.

The cart may be used by the consumers also with an additional payment precisely in order to offer the consumer the possibility of taking part in the auctions. The same cart provided with a timer could also be used for statistical purposes in order to calculate the average time spent by individuals making purchases. Moreover, the device mounted on the cart may envisage that the temporary proprietor of the cart can set a certain number of automatic bids for a predetermined amount. For example, if an individual intends making a maximum bid of 5 Euros per product, bids may be automatically repeated until that amount is reached. This avoids the need for a high degree of manual interaction which would complicate things excessively for individuals who are shopping.

The supermarket or shopping centre may also have special tills where people are able to collect the product/service won without having to queue.

Advantageously, the identification code of the winner may be either printed out, sent to the winner by SMS, transferred onto a mobile phone via Bluetooth or sent by email.

Advantageously, the winner of the auction has a code which must be combined in order for the auctioned product/service to be sent.

Advantageously, the system consists of a facial recognition system able to recognize the user who makes the bids via the specific remote terminal;

Advantageously, the system consists of an Automatic Speech Recognition (ASR) system for being able to receive a bid, including vocal bids, which will be stored on the server;

Advantageously, the system consists of an ASR system for being able to receive an identification code in vocal form in order to recognize the winner of the auction and start the procedure for preparing the product to be collected;

Advantageously, the product/service offered is secret and is not described at all apart from its usefulness for consumers;

Advantageously, once the code which the winner must be provide in order to be able to collect and pay for the product and/or service won is shown on the display, the winner may interact with the terminal, providing other data in order to ensure safe and reliable allocation of the object;

Advantageously, the winner of the auction may communicate a password, a pin or some other identification data in order to be able to collect the product and/or service won. Advantageously, the bid for acquiring the product/service, in the event of prizes, may be made using points and not money;

Advantageously, the data associated with the product on offer comprises an expiry date for collection of the product;

Advantageously, the data associated with the product on offer includes a stock of products/services;

Advantageously, the system can notify the user that an update of the auction status will be shown after a given time period;

Advantageously, the individual making the bids may view the current status of the auction also by means of a remote command.

Advantageously, the bid for acquiring the product may be sent by one of the following means: via a touch screen display, a keyboard, Bluetooth, remote control, SMS, phone call or instant messaging system;

Advantageously, the winner of the auction may be identified by means of a code associated with a card;

Advantageously, the winner of the auction may be identified by means of a fingerprint reader;

Advantageously, the winner may provide his/her identification code by means of a microphone;

Advantageously, if the first winner does not collect the prize, the second highest bid maker may be included in a waiting list; this list is updated and may inform the individual on the waiting list of the availability of the product;

Advantageously, the winner of the auction must supply several codes in order to collect the merchandise;

Advantageously, the personal data of the winner is never supplied and is not sent over telephone and/or data communication channels;

Advantageously, during the auction, the individual making the bid is notified that said auction will continue after a certain time period;

Advantageously, the final user may check the auction status also by means of a remote control device, querying the terminal which verifies said status;

Advantageously, the mechanism for offering products and/or services by means of auctions is such that it is not limited to a predefined completion time for the auction with the best bid winning, but also includes a system which terminates only when there is no other higher bid sent within a given time interval, this interval being repeated cyclically until a further bid is no longer received;

Advantageously, the interactive auction is started on the display only if there are a number of contacts in the proximity of one display and/or a series of displays;

Advantageously, the end user, provided with a device, may also make bids from the shopping cart;

Advantageously, the cart provided with the device used to make bids has a system for making a certain number of automatic bids as desired by the cart proprietor;

Advantageously, the display where the auction bids appear may be installed on the shopping carts which are equipped with them;

Advantageously, the cart used to make the bids simply has a pushbutton which, when pressed, makes a bid for a predetermined amount which is the same for everyone;

Advantageously, the auction price, once a maximum bid is reached, stops and the prize is assigned to the winner who has reached the maximum price;

Advantageously, the cart may also be provided with a timer which can be used also for statistical purposes in order to calculate the average time spent by individuals making purchases;

Advantageously, the supermarket or shopping centre housing the displays showing the bids may also have special tills where people are able to collect the product/service won without having to queue;

Advantageously, the method also envisages that the objects which are placed on sale using the auction mode may also be printed out automatically in paper form and promoted within the premises;

Advantageously, for every certain number of auctions which are publicized for showing on the displays, a summary of the products and/or services offered together with their main features is automatically printed out in paper form;

Advantageously, the communication system, interacting with a plurality of devices, allows assignment of a product/service without transmission of the winner's personal data.

The communication system according to the present invention interacts with a plurality of devices, allows assignment of at least one article such as a product and/or a service without transmission of the winner's personal data.

SUMMARY OF THE INVENTION

The instant invention is an electronic auctioning system comprising a main server including auctioning application programs encoded therein, and means for communicating with other electronic devices and systems; at least one remote terminal including means for communicating with said main server, and means for communicating with remote individual communication devices that are within a predetermined distance thereof; at least one remote individual communication device including means for communicating with one of said at least one remote terminal, a display screen, audio output means, audio input means, and means for electronic data input; wherein said auctioning application programs of said main server are adapted to provide the means for displaying a product or service upon said display screen and through said audio output means of said at least one remote terminal, information about said product or service, and information pertaining to predefined auction parameters for attempting to purchase said product or service; and wherein said auctioning application programs of said main server are adapted to provide the means for a user of said at least one remote terminal to send information back to and interact with said main server in order to initiate and participate within the resulting auction to attempt to purchase said product or service; wherein said auctioning application programs of said main server are also adapted to determine a winner of said auction, notify the winner of said auction, and notify all of said at least one user that the auction has ended without relaying or displaying any information about said winner; and wherein a means for product or service collection is provided, such that said winner can obtain said product or service.

BRIEF DESCRIPTION OF THE DRAWINGS

FIG. 1 is a block diagram showing how an advertiser connects electronically to a user and sends details of an auction.

FIG. 2 is a flow diagram showing how an advertiser inserts the data of an auction.

FIG. 3 is a block diagram showing how several individuals present in one particular shopping centre can visualize and interact with auction bids on the displays.

FIG. 4 is a flow diagram showing how a potential purchaser equipped with a card to which an identification code has been assigned sends a bid via the terminal itself or other means.

FIG. 5 illustrates how an advertiser can create a campaign, give it a name, assign a start date and duration and enter other details via a data entry template.

DESCRIPTION OF THE PREFERRED EMBODIMENT

Figure 6:
FIG. 6 illustrates several clients in a supermarket while shopping, and upon seeing products/services offered for auction on the terminals the clients can make bids directly via their shopping cart.

FIG. 1 is a block diagram showing how an advertiser provided with hardware (100) connected via the Internet and/or by a device with telephone connection (102), is able to send the details of an auction bid to a server (104). The server is always connected to the Internet and/or via a device (106) with telephone connection to remote terminals provided with displays and application programs (108) which are always connected to the network and/or by telephone. The remote terminals show the auction bids and interact with the users concerned who formalize the bids (110). The bidders interact with the server and the winner goes to the location where the product/service won can be paid for and collected, and here, owing to other means and application programs which are always connected to the Internet and/or via a telephone connection, is recognized as being the actual winner (112).

FIG. 2 is a flow diagram showing how an advertiser (202) inserts the data of an auction (204) via an auction composition module (206) and selects the displays which are to show the auction (208) and which are provided with an auction reception module (210). The auction is sent to the remote device (212) and is shown on the display via another display module (214). By means of a module (216) for entry of the bid by the interested individuals, the highest bid is awarded the product/service via an assignment module (218). By means of an identification code generation module (220) it is possible to identify, for collection of the product/service, the winner of the auction, who, by means of a recognition confirmation module (222), collects the product/service. A special feedback assignment module (224) allows users to express their opinion. All the bids and the interacting operations are stored in a database (226).

FIG. 3 is a block diagram showing how several individuals present in one particular shopping centre (302) can visualize and interact with auction bids on the displays. All the displays are connected to a central server. The data received from the various individuals is analysed (304), and the winner is processed (306).

FIG. 4 is a flow diagram showing how a potential purchaser (402) equipped with a card (404) to which an identification code has been assigned, sends a bid via the terminal itself or other means (406). The central server receives the bid and associates the code with the card, processing the highest bid and associated winner (408). The winning bid is communicated to the winner (410). The winner goes to the location for collection of the product/service, with the possibility of making payment from the amount on the pre-paid card (412). Feedback may be left by the winner of the auction and/or by the supplier (414).

FIG. 5 shows how an advertiser can create a campaign, give it a name, assign a start date and duration and enter other details via a data entry template. For example, the advertiser may select the location, type and target for the terminals on which the offers are to be shown, check the potential number of terminals on which viewing will be possible, and create the advertisement by loading one or more photos, one or more videos, one or more audios and writing a text for the advertisement. The offer may then be publicized so that it is shown on the displays.

FIG. 6 shows several clients in a supermarket (606) while shopping. Upon seeing products/services offered for auction on the terminals the clients can make bids directly via the shopping cart, in one version, by simply pressing a pushbutton (608) and, in another fuller version, by interacting with a more complex device (610).

Figure 7:
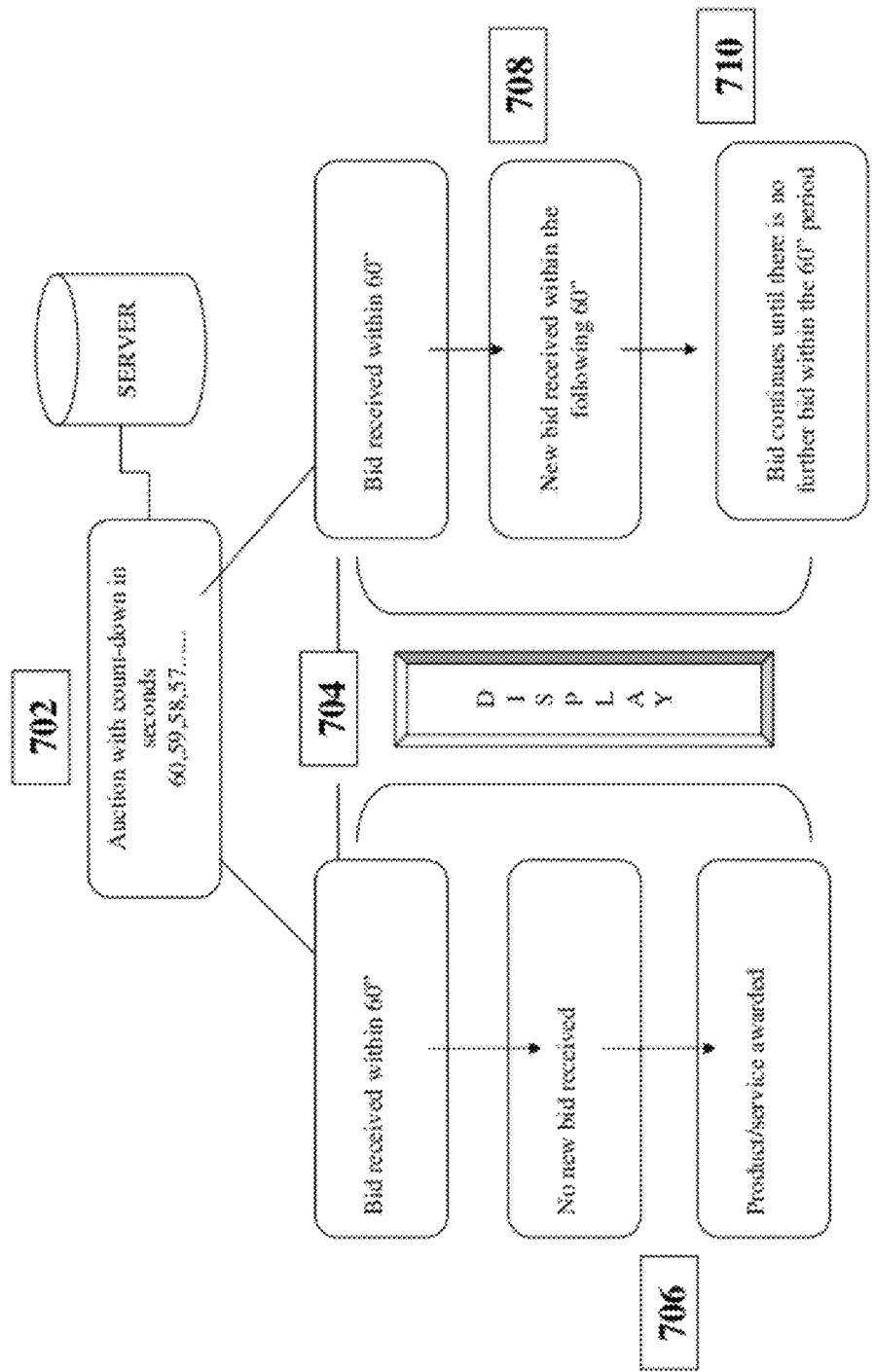
FIG. 7 illustrates the logic process for the definition of an interactive auction which is shown on the display and can be accessed by the interested users that are physically present in the area in the vicinity of the displays.

FIG. 7 shows the logic process for definition of the interactive auction which is shown on the display and can be accessed by the interested users who are physically present in the area in the vicinity of the displays. The auctioning of products and/or services (702) is defined so that every 60 seconds the auction continues provided that there are new bids (704). If there are no new bids, the last bid made wins the product/service (706). If at the end of the 60-second period, a new bid has been received (708), the counter restarts for another 60 seconds and the system continues until the last bid is not outbidded within the following 60-second periods (710).

Figure 8:
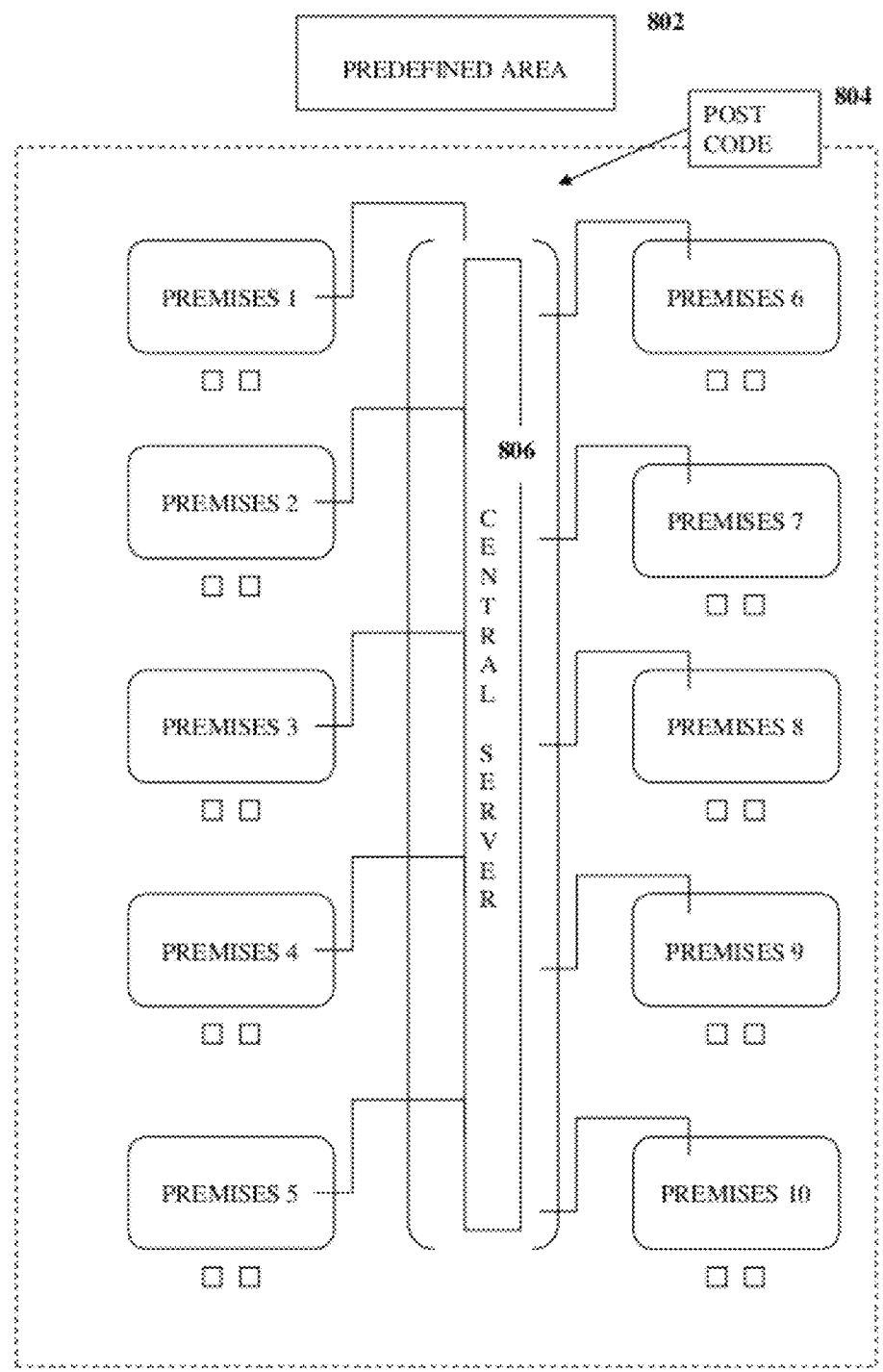
FIG. 8 illustrates an example where in a predefined area there are 10 premises which have 2 displays, each of which show the products and/or services which are offered on auction.

FIG. 8 shows the case where, in a predefined area (802), for example a given zone (804) identified by means of a postal code, there are 10 premises which have 2 displays, each of which show the products and/or services which are offered on auction. In each of the premises the individuals may make bids and the winner will arise from the individuals who interact in the various premises. Each of the premises which has the 2 terminals is connected to the central server (806).

Figure 9:
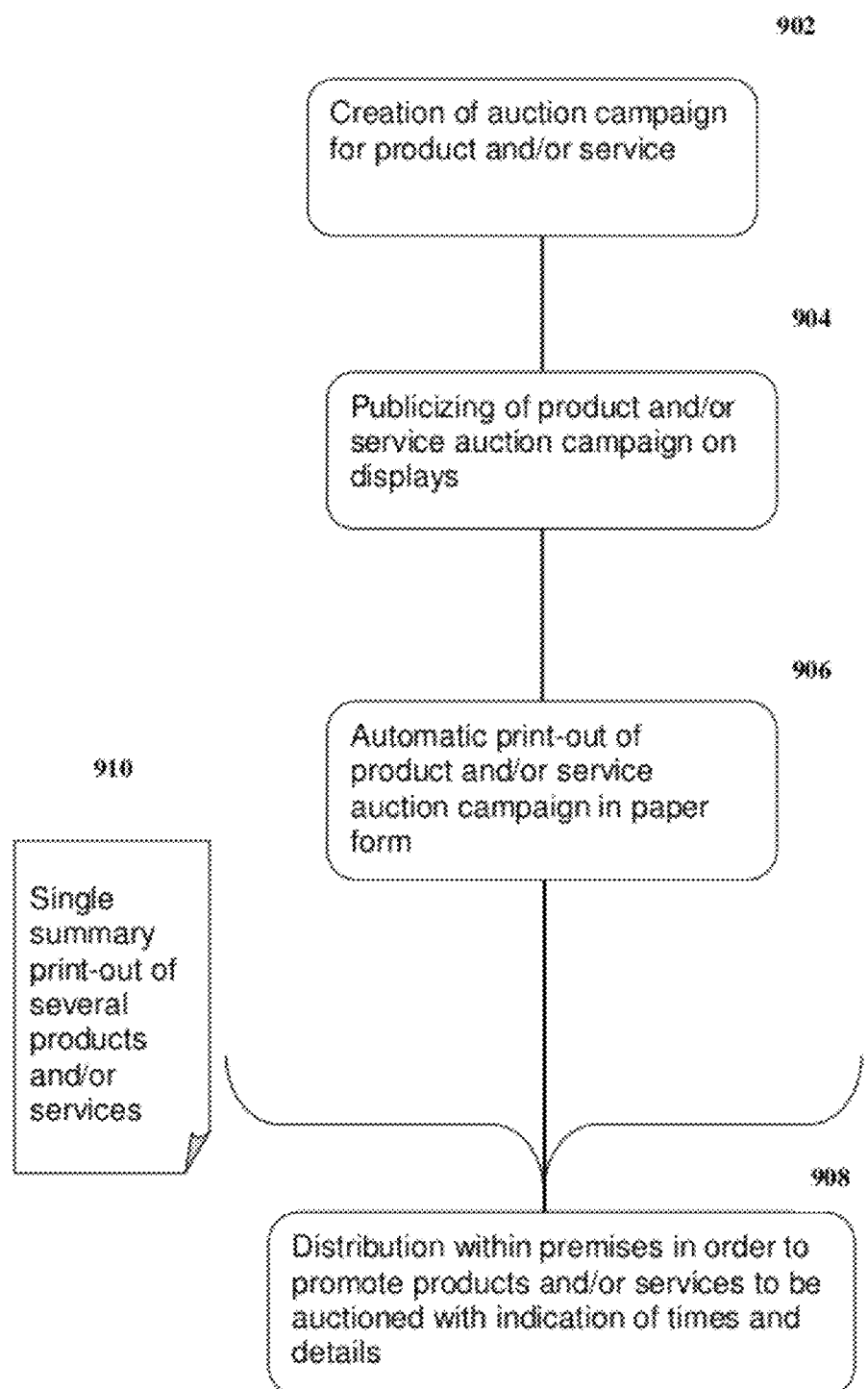
FIG. 9 illustrates a block diagram showing how an auction campaign is created and then publicized and shown on the displays.

FIG. 9 is a block diagram showing how an auction campaign is created (902) and then publicized and shown on the displays (904). When publicized the product and/or service offered for auction is printed in paper form by a special device (906). The print-outs are then distributed in order to promote the event with the main features of the product and/or service offered (908). The print-out may also be cumulative and include several products and/or services which are on offer (910).

It will be appreciated how, with this new knowledge, the various logic units, configurations, modules, circuits, and steps described in connection with the inventions made public in this patent may be implemented as electronic hardware, computer software or a combination of the two. In order to illustrate clearly this interchangeability of hardware and software, illustrative components, units, configurations, modules and circuits have been described generically with reference to their functions only. Those skilled in the art may implement the functions described, but any such implementation must not be interpreted as lying outside the scope of this invention.

The systems and the methods described with the characteristic features of the invention may be included directly in the hardware, in a software module executed by a processor, or in a combination of the two. A software module may reside in the RAM, a flash memory or a read-only memory (ROM), in a programmable memory (PROM) or in an EPROM, EEPROM, registers, hard disks, removable disks, compact disks or other form of storage medium known in the present state of the art. A storage medium is combined with a processor so that the processor can read the information and write onto the storage medium. Alternatively, the storage medium may reside in a specific integrated circuit (ASIC). The ASIC may reside in a device, a computer, an operating terminal or a telephone. Alternatively, the processor and the storage medium may reside as electronic components with a single circuit in a device, a computer, an operating terminal or a telephone.

It is to be understood that the present invention is not limited to the improvements of the art described, but it must be accepted and understood within the broadest possible meaning applicable to all the operating principles and characteristic features described in the claims.

Any and all other obvious modifications to one or more of the parts of this invention are inherently incorporated herein.

What is claimed is:

1. A method of performing an auction through use of a main server, a remote terminal, and at least one remote individual communication device, the method comprising the steps of:
   receiving by the main server one or more parameters of an auction, the one or more parameters including a predefined shopping area having a plurality of predetermined shopping sections and a predefined set of terms for attempting to purchase a product or a service;
   transmitting information between the main server and the remote terminal located within a particular shopping section, the information comprising the product or the service available within the particular shopping section, the predefined set of terms for attempting to purchase the product or the service, and a location of the remote terminal;
   displaying on a display device of the remote terminal the information;
   conducting by the main server an auction in accordance with the predefined set of terms for the product or the service, said conducting step further comprising the step of receiving by the main server data from the at least one remote individual communication device within a predetermined distance of the remote terminal, the data including a bid for the product or the service;
   determining by the main server a winner of the auction based on the data received from the at least one remote individual communication device, the winner associated with a particular remote individual communication device;
   sending by the main server to the particular remote individual communication device a first notification including details for obtaining the product or the service, said sending step further comprising the step of transmitting by the main server to the at least one remote individual communication device a second notification that the auction has ended.

2. The method according to claim 1 further comprising the step of:
   identifying the winner by one or more identifying information selected from the group comprising: a code provided by the main server, a password provided by the main server, a pre-coded electronic card, one or more fingerprints, a facial recognition, and a speech recognition.

3. The method according to claim 1 further comprising the step of:
   receiving by the main server confirmation that the product or the service was obtained by the winner.

4. The method according to claim 1, wherein said conducting step further comprises the step of:
   printing by the remote terminal a paper listing the product or the service.

5. The method according to claim 1, wherein the first notification includes details regarding a till where the winner can retrieve the product or the service won.

6. The method according to claim 1, wherein said conducting step further comprises the step of:
   notifying by the main server to the at least one remote individual communication device the time the auction ends.

7. The method according to claim 1, wherein said determining step further comprises the step of:
   creating a list of alternate winners of the auction.

8. The method according to claim 7, wherein said sending step further comprises the step of communicating by the main server to the at least one remote individual communication device a third notification that the winner is an alternate winner from the list.

9. The method according to claim 1, wherein said displaying step further comprises the step of:
   illustrating on the display device of the remote terminal a description of a secret product or a secret service, the description including the usefulness of the secret product or the secret service.

10. The method according to claim 1, wherein said conducting step further comprises the step of:
    making automated bids by the at least one remote individual communication device using an automated recognition software application.

11. The method according to claim 10, wherein the automated recognition software communicates with one or more selected from the group comprising: a fingerprint scanner, a facial recognition software application, and a speech recognition software application.

12. The method according to claim 1, further comprising the step of illustrating by the remote terminal a summary of a plurality of auctions.

13. The method according to claim 12, wherein said illustrating step further comprises the step of printing by the remote terminal the summary.

14. The method according to claim 1, further comprising the step of submitting to the main server from the at least one remote individual communication device feedback.

15. The method according to claim 14, wherein the feedback is relating to one or more selected from the group comprising: a provider, the supplier of the product or the service, and the quality of the product or the service.

16. A system of performing an auction, comprising
a main server for receiving one or more parameters of an auction, the one or more parameters including a predefined shopping area having a plurality of predetermined shopping sections and a predefined set of terms for attempting to purchase a product or a service, the main server further conducting an auction in accordance with the predefined set of terms for the product or the service;
a remote terminal in communication with the main server, the remote terminal including a display device for displaying information comprising the product or the service available within the particular shopping section, the predefined set of terms for attempting to purchase the product or the service, and a location of the remote terminal;
at least one remote individual communication device within a predetermined distance of the remote terminal, the at least one remote individual communication device for providing a bid for the product or the service to the main server;
the main server determining a winner of the auction, the winner associated with a particular remote individual communication device,
the main server sending a first notification to the particular remote individual communication device and a second notification to the at least one remote individual communication device, the first notification including details for obtaining the product or the service and the second notification that the auction has ended.

17. The system according to claim 16, wherein the winner is identified by one or more identifying information selected from the group comprising: a code provided by the main server, a password provided by the main server, a pre-coded electronic card, one or more fingerprints, a facial recognition, and a speech recognition.

18. The system according to claim 16, wherein the main server receives confirmation that the product or the service was obtained by the winner.

19. The system according to claim 16, wherein the remote terminal prints a paper listing the product or the service.

20. The system according to claim 16, wherein the first notification includes details regarding a till where the winner can retrieve the product or the service won.

21. The system according to claim 16, wherein the main server notifies the at least one remote individual communication device the time the auction ends.

22. The system according to claim 16, wherein the main server creates a list of alternate winners of the auction.

23. The system according to claim 22, wherein the main server communicates to the at least one remote individual communication device a third notification that the winner is an alternate winner from the list.

24. The system according to claim 16, wherein the remote terminal illustrates on the display device a description of a secret product or a secret service, the description including the usefulness of the secret product or the secret service.

25. The system according to claim 16, wherein the at least one remote individual communication device makes automated bids by using an automated recognition software application.

26. The system according to claim 25, wherein the automated recognition software communicates with one or more selected from the group comprising: a fingerprint scanner, a facial recognition software application, and a speech recognition software application.

27. The system according to claim 16, wherein the remote terminal illustrates on the display device a summary of a plurality of auctions.

28. The system according to claim 27, wherein the remote terminal prints the summary.

29. The system according to claim 16, wherein the at least one remote individual communication device submits feedback to the main server.

30. The system according to claim 29, wherein the feedback is relating to one or more selected from the group comprising: a provider, the supplier of the product or service, and the quality of the product or service.

* * * * *